US011029521B2

(12) United States Patent
Kalinowski et al.

(10) Patent No.: US 11,029,521 B2
(45) Date of Patent: Jun. 8, 2021

(54) HEAD-MOUNTED DEVICE WITH AN ADJUSTABLE OPACITY SYSTEM (71) Applicant: Apple Inc., Cupertino, CA (US)

(72) Inventors: David A. Kalinowski, Redwood City, CA (US); Hyungryul Choi, San Jose, CA (US); Jae Hwang Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 16/352,652

(22) Filed: Mar. 13, 2019

(65) Prior Publication Data
US 2019/0324274 A1 Oct. 24, 2019

Related U.S. Application Data (60) Provisional application No. 62/662,099, filed on Apr. 24, 2018.

(51) Int. Cl.
G02B 27/01 (2006.01)
G02F 1/01 (2006.01)
G02B 27/00 (2006.01)

(52) U.S. Cl.
CPC ....... *G02B 27/0172* (2013.01); *G02F 1/0126* (2013.01); *G02B 27/0093* (2013.01); *G02B 2027/0118* (2013.01); *G02F 2202/14* (2013.01)

(58) Field of Classification Search
CPC ........ G02B 27/0172; G02B 2027/0118; G02B 27/017–2027/0178; G02F 1/0126
See application file for complete search history.

(56) References Cited

U.S. PATENT DOCUMENTS 8,189,263 B1 * 5/2012 Wang ................. G02B 27/0172
359/633
8,678,282 B1 3/2014 Black et al.
8,724,206 B2 * 5/2014 Spitzer ............... G02B 27/0101
359/241

(Continued)

FOREIGN PATENT DOCUMENTS

CN 104603673 A 5/2015
CN 105044913 A 11/2015

(Continued)

Primary Examiner — Zachary W Wilkes
(74) Attorney, Agent, or Firm — Treyz Law Group, P.C.; Joseph F. Guihan (57) ABSTRACT A head-mounted device may have a transparent display. The transparent display may be formed from a display unit that provides images to a user through an optical coupler. A user may view real-world objects through the optical coupler while control circuitry directs the transparent display to display computer-generated content over selected portions of the real-world objects. The head-mounted display may also include an adjustable opacity system. The adjustable opacity system may include an adjustable opacity layer such as a photochromic layer that overlaps the optical coupler and a light source that selectively exposes the adjustable opacity layer to ultraviolet light to control the opacity of the adjustable opacity layer. The adjustable opacity layer may block or dim light from the real-world objects to allow improved contrast when displaying computer-generated content over the real-world objects.

13 Claims, 6 Drawing Sheets (56) References Cited

U.S. PATENT DOCUMENTS

| | | | |
|---|---|---|---|
| 8,786,675 B2 | 7/2014 | Deering | |
| 8,941,559 B2 | 1/2015 | Bar-Zeev et al. | |
| 8,982,471 B1 | 3/2015 | Starner et al. | |
| 9,122,053 B2 | 9/2015 | Geisner et al. | |
| 9,129,295 B2* | 9/2015 | Border | G02B 27/017 |
| 9,857,170 B2 | 1/2018 | Abovitz et al. | |
| 10,046,229 B2 | 8/2018 | Tran et al. | |
| 10,067,344 B2* | 9/2018 | Kilcher | G02F 1/0147 |
| 10,228,566 B2 | 3/2019 | von und zu Liechtenstein | |
| 10,231,614 B2 | 3/2019 | Krueger | |
| 2016/0165220 A1* | 6/2016 | Fujimaki | G02B 27/017 |
| | | | 348/49 |
| 2017/0090194 A1* | 3/2017 | Hayes | G02B 27/0172 |
| 2017/0173262 A1 | 6/2017 | Veltz | |
| 2017/0184894 A1* | 6/2017 | Hayashi | G02B 27/0172 |
| 2018/0003966 A1* | 1/2018 | Kilcher | G02B 27/0093 |
| 2019/0046276 A1 | 2/2019 | Inglese et al. | |

FOREIGN PATENT DOCUMENTS

| | | |
|---|---|---|
| CN | 106773067 A | 5/2017 |
| CN | 106918963 A | 7/2017 |
| CN | 107683220 A | 2/2018 |
| RO | 127143 A2 | 2/2012 |

\* cited by examiner

HEAD-MOUNTED DEVICE WITH AN ADJUSTABLE OPACITY SYSTEM

This application claims the benefit of provisional patent application No. 62/662,099, filed Apr. 24, 2018, which is hereby incorporated by reference herein in its entirety.

BACKGROUND

This relates generally to devices with displays, and, more particularly, to head-mounted displays.

Head-mounted displays may be used to display virtual reality and augmented reality content. A head-mounted display that is displaying augmented reality content may overlay computer-generated images on real-world objects. If care is not taken, the computer-generated images may be difficult to see against the real-world objects, real-world objects may distract a viewer, or other issues may arise with displayed content.

SUMMARY

An electronic device such as a head-mounted device may have a transparent display. The transparent display may be formed from a display panel that provides images to a user through an optical coupler. A user may view real-world objects through the optical coupler while control circuitry directs the transparent display to display computer-generated content over selected portions of the real-world objects.

The head-mounted display may include an adjustable opacity system. The adjustable opacity system may include an adjustable opacity layer such as a photochromic layer that overlaps the optical coupler and a light source that selectively exposes the adjustable opacity layer to light to control the opacity of the adjustable opacity layer. The light source may emit ultraviolet light to control the adjustable opacity layer. The adjustable opacity layer may block or dim light from the real-world objects to allow improved contrast when displaying computer-generated content over the real-world objects.

The light source for the photochromic layer may share an optical coupler with a display unit that generates images for viewing by the user. Alternatively, the light source may emit light into a first optical coupler that redirects the light towards selected portions of the photochromic layer, whereas the display unit may emit display light into a second optical coupler that redirects the display light towards the viewer. A heating element may be positioned adjacent the adjustable opacity layer to heat the adjustable opacity layer. The optical coupler and adjustable opacity layer may be interposed between first and second filter layers that block light from the light source for the adjustable opacity system. Ultraviolet light absorbing material may also be included in the head-mounted device to prevent stray ultraviolet light from reaching the user's eyes.

DETAILED DESCRIPTION

Head-mounted devices and other devices may be used for virtual reality and augmented reality systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include transparent displays and other optical components. Device configurations in which virtual reality and/or augmented reality content is provided to a user with a head-mounted display are described herein as an example. This is, however, merely illustrative. Any suitable equipment may be used in providing a user with virtual reality and/or augmented reality content.

A head-mounted device such as a pair of augmented reality glasses that is worn on the head of a user may be used to provide a user with computer-generated content that is overlaid on top of real-world content. The real-world content may be viewed directly by a user (e.g., by observing real-world objects through a transparent display panel or through an optical coupler in a transparent display system that merges light from real-world objects with light from a display panel). Configurations in which images or real-world objects are captured by a forward-facing camera and displayed for a user on a display may also be used.

Figure 1:
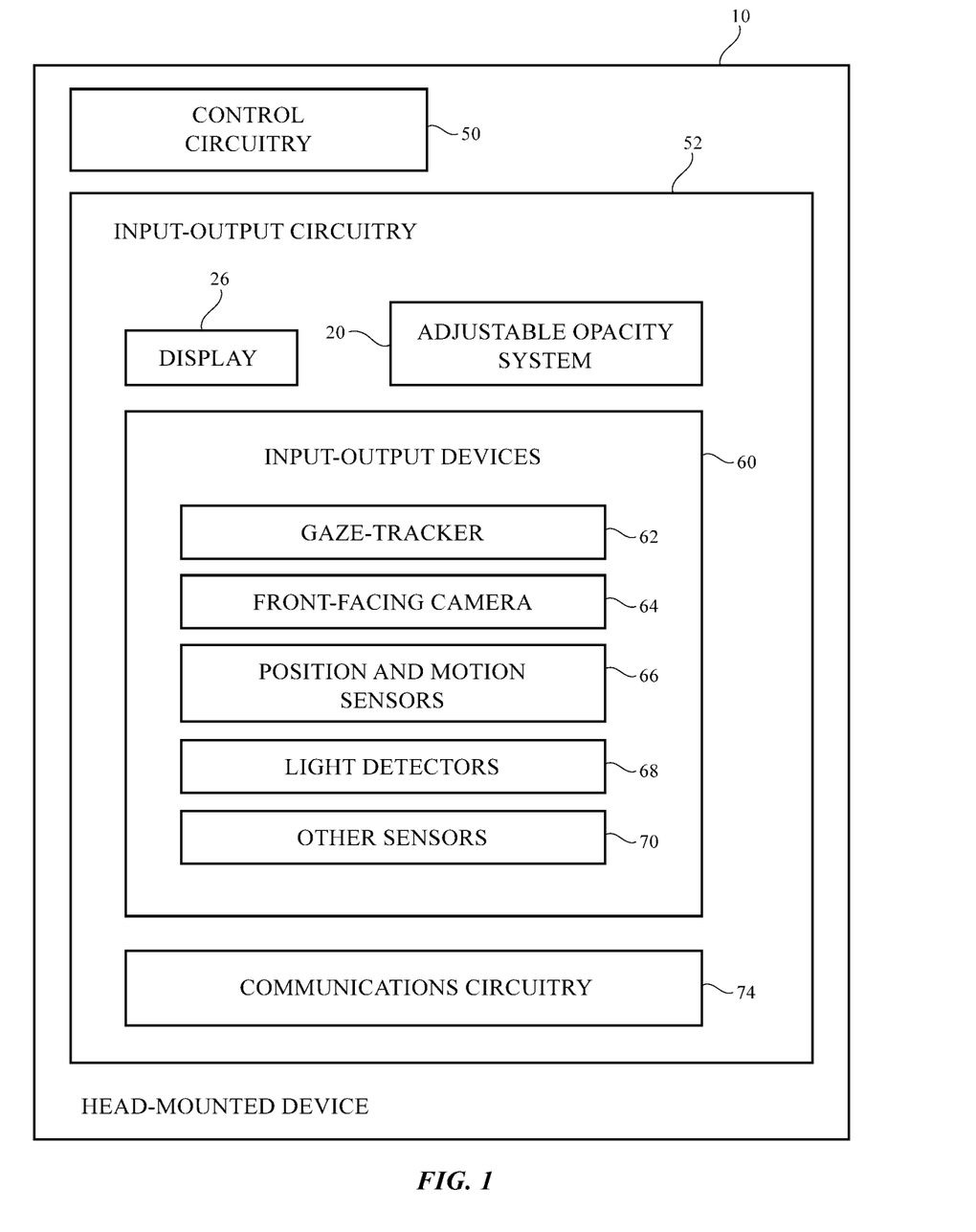
FIG. 1 is a schematic diagram of an illustrative head-mounted device in accordance with an embodiment.

A schematic diagram of an illustrative head-mounted device is shown in FIG. 1. As shown in FIG. 1, head-mounted device 10 (sometimes referred to as head-mounted display 10) may have control circuitry 50. Control circuitry 50 may include storage and processing circuitry for controlling the operation of head-mounted device 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement control operations for head-mounted device 10 (e.g., data gathering operations, operations involving the adjustment of components using control signals, etc.).

Head-mounted device 10 may include input-output circuitry 52. Input-output circuitry 52 may be used to allow data to be received by head-mounted device 10 from external equipment (e.g., a tethered computer, a portable device such as a handheld device or laptop computer, or other electrical equipment) and to allow a user to provide head-mounted device 10 with user input. Input-output circuitry 52 may also be used to gather information on the environment in which head-mounted device 10 is operating. Output components in circuitry 52 may allow head-mounted device 10 to provide a user with output and may be used to communicate with external electrical equipment.

As shown in FIG. 1, input-output circuitry 52 may include a display such as display 26. Display 26 may be used to display images for a user of head-mounted device 10. Display 26 may be a transparent display so that a user may observe real-world objects through the display while computer-generated content is overlaid on top of the real-world objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display).

The head-mounted device may include adjustable components stacked in series with display 26. For example, the head-mounted device may include an adjustable polarizer (e.g., a polarizer with switches that allow selected regions of the adjustable polarizer to be configured to serve as vertical-pass linear polarizers, horizontal-pass linear polarizers, or non-polarizing regions), tunable lenses (e.g., liquid crystal tunable lenses, tunable lenses based on electrooptic materials, tunable liquid lenses, microelectromechanical systems tunable lenses, or other tunable lenses), and/or an adjustable color filter (e.g., an adjustable-color-cast light filter that can be adjusted to exhibit different color casts and/or a monochromatic adjustable-intensity light filter that has a single color cast).

Adjustable opacity system 20 may also be incorporated into head-mounted device 10. The adjustable opacity system may include an adjustable opacity layer that is stacked in series with display 26 so that the adjustable opacity layer overlaps display 26 and so that the user may view real-world objects through the adjustable opacity layer and display 26. The adjustable opacity system may be adjusted in real time using control signals from control circuitry 50.

Adjustable opacity system 20 may be a photochromic light modulating device.

Adjustable opacity system 20 may include a light source that selectively exposes a photochromic layer to light. The photochromic layer (sometimes referred to as an adjustable opacity layer) may be controlled globally or may have an array of individually adjustable light modulator regions (sometimes referred to as light modulator pixels) that are adjusted between a transparent state and an opaque state. In the transparent state, transmission may be 100% or nearly 100% (e.g., greater than 99%, greater than 95%, etc.). In the opaque state, transmission is 0% or nearly 0% (e.g., less than 1%, less than 5%, etc.). Intermediate levels of light transmission (e.g., transmission values between 0% and 100%) may also be selectively produced by each of the pixels of the adjustable opacity layer.

There may be any suitable number of display pixels in display 26 and adjustable light modulator pixels in adjustable opacity system 20 (e.g., 0-1000, 10-10,000, 1000-1,000,000, 1,000,000 to 10,000,000, more than 1,000,000, fewer than 1,000,000, fewer than 10,000, fewer than 100, etc.).

Input-output circuitry 52 may include components such as input-output devices 60 for gathering data and user input and for supplying a user with output. Devices 60 may include a gaze-tracker such as gaze-tracker 62 (sometimes referred to as a gaze-tracking system or a gaze-tracking camera) and a camera such as camera 64.

Gaze-tracker 62 may include a camera and/or other gaze-tracking system components (e.g., light sources that emit beams of light so that reflections of the beams from a user's eyes may be detected) to monitor the user's eyes. Gaze-tracker(s) 62 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze detection cameras, eye tracking cameras, gaze-tracking cameras, or eye monitoring cameras. If desired, other types of image sensors (e.g., infrared and/or visible light-emitting diodes and light detectors, etc.) may also be used in monitoring a user's gaze. The use of a gaze detection camera in gaze-tracker 62 is merely illustrative.

Cameras such as front-facing camera(s) 64 may be used to capture images of the real-world environment surrounding the user. For example, one or more front-facing cameras 64 may be used to capture images of real-world objects in front of a user and on the left and right sides of a user's field of view. The images of real-world objects that are gathered in this way may be presented for the user on display 26 and/or may be processed by control circuitry 50 to determine the locations of electronic devices (e.g., displays, etc.), people, buildings, and other real-world objects relative to the user. The real-world environment may also be analyzed using image processing algorithms. Information from camera 64 may be used in adjusting optical components such as adjustable opacity system 20 and controlling display 26.

As an example, control circuitry 50 can identify the location of a real-world object such as a door to a building and can automatically overlay computer-generated content (e.g., a text label) on the door. As another example, control circuitry 50 may identify regions of the user's field of view that contain sources of glare. Control circuitry 50 may then adjust appropriate light modulator pixels in adjustable opacity system 20 to prevent the glare from reaching the eyes of the user.

In addition to adjusting adjustable components such as display 26 and adjustable opacity system 20 based on information from gaze-tracker 62 and/or front-facing cameras 64, control circuitry 50 may gather sensor data and user input from other input-output circuitry 52 to use in controlling head-mounted device 10. As shown in FIG. 1, input-output devices 60 may include position and motion sensors 66 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Using sensors 66, for example, control circuitry 50 can monitor the current direction in which a user's head is oriented relative to the surrounding environment. Movements of the user's head (e.g., motion to the left and/or right to track on-screen objects and/or to view additional real-world objects) may also be monitored using sensors 66.

Light detectors 68 may include ambient light sensors that measure ambient light intensity and/or ambient light color. Input-output devices 60 may also include other sensors and input-output components 70 (e.g., force sensors, temperature sensors, touch sensors, buttons, capacitive proximity sensors, light-based proximity sensors, other proximity sensors, strain gauges, gas sensors, pressure sensors, moisture sensors, magnetic sensors, microphones, speakers, audio components, haptic output devices, light-emitting diodes, other light sources, etc.). Circuitry 52 may include wired and wireless communications circuitry 74 that allows head-mounted device 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted device 10.

Figure 2:
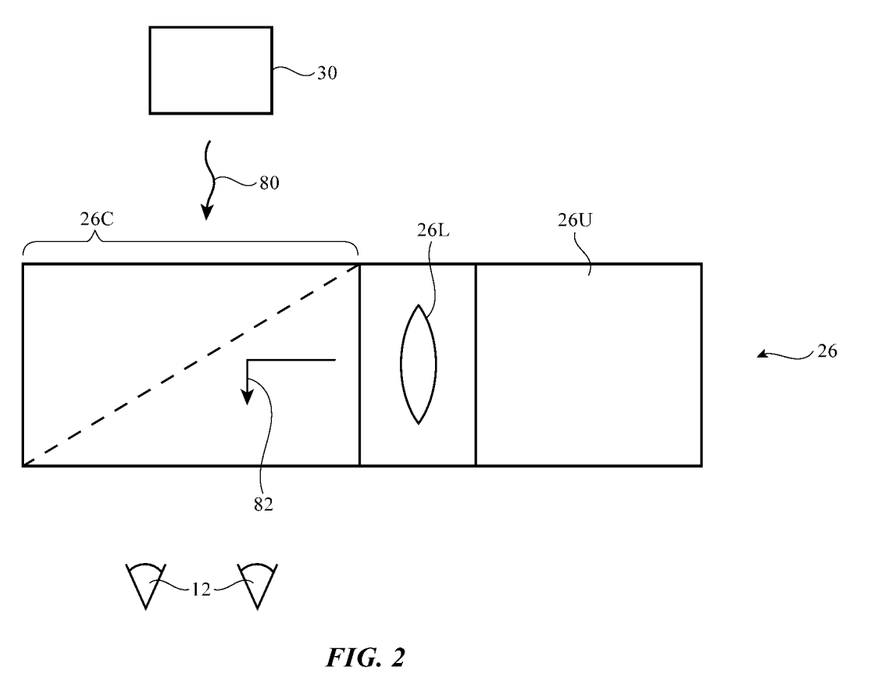
FIG. 2 is a diagram of an illustrative transparent display with a tunable lens and a partially reflective element that serves as an optical coupler to direct images from one or more non-transparent display panels to a user in accordance with an embodiment.

FIG. 2 is a diagram showing how display 26 may be a transparent display that has a display unit 26U that creates images that are reflected toward the eyes 12 of the user by optical coupler 26C. Display unit 26U may include, for example, a liquid crystal on silicon display and/or any other type of display with a pixel array that displays images. Display unit 26U may include light-emitting diodes or other light sources for illuminating the images produced by a liquid crystal on silicon display (as an example). In some configurations, images may be produced by multiple display devices in display unit 26U (e.g., multiple images that are combined using an optical combiner in display unit 26U).

Optical coupler 26C may be a beam splitter, a holographic coupler, a partially reflective element such as a partially reflective mirror, or other optical coupler. Optical coupler 26C may be placed in front of the user's eyes 12 and may be partially transparent, so that the user can view external objects such as real-world object 30 through optical coupler 26C. During operation, light from an array of display pixels in display unit 26U such as light 82 may be directed to optical coupler 26C. A waveguide, holographic coupling element, and/or other structures in coupler 26C may direct light 82 towards user eyes 12. Light 80 from real-world object 30 may also pass through the beam splitter or other coupling structures in optical coupler 26C to the user's eyes 12. In this way, the user may view both real-world content and overlaid images (e.g., computer-generated images) from display unit 26U, creating an augmented reality environment.

Display 26 may include fixed and/or tunable lenses, as illustrated by lens 26L. These lenses, which may include reflective elements, transparent lens elements, and/or other lens structures, may be dynamically adjusted during operation of head-mounted device 10 to place computer-generated images from display unit 26U at multiple different focal planes using time-division multiplexing, thereby enhancing the realism of the user's augmented reality environment. Images may also be placed at multiple different focal planes by combining images from multiple different display devices in unit 26U using a beam splitter or other optical combiner.

If desired, the functions of lens 26L and/or display unit 26U may be combined with optical coupler 26C. As an example, optical coupler 26C may have built-in lenses (e.g., embedded lens power) that work in combination with or replace lens 26L in FIG. 2. In another example, optical coupler 26C may include transparent display pixels (e.g., an array of transparent organic light-emitting diode display pixels) that generate the display light 82.

In some situations (e.g., direct or indirect sunlight), real-world light 80 may have high brightness levels. In these situations, it may be difficult to generate display light 82 that has sufficient contrast with real-world light 80 (e.g., so that the computer-generated images on the display do not appear dim) without risking viewer discomfort or eye damage from high light intensity levels. Therefore, to reduce the brightness of the light from real-world objects the head-mounted device may include adjustable opacity system 20 (shown in FIGS. 5-7). The adjustable opacity system may enable local opacity control in the head-mounted device (e.g., the adjustable opacity system has a plurality of individually controllable adjustable opacity pixels).

Figure 3:
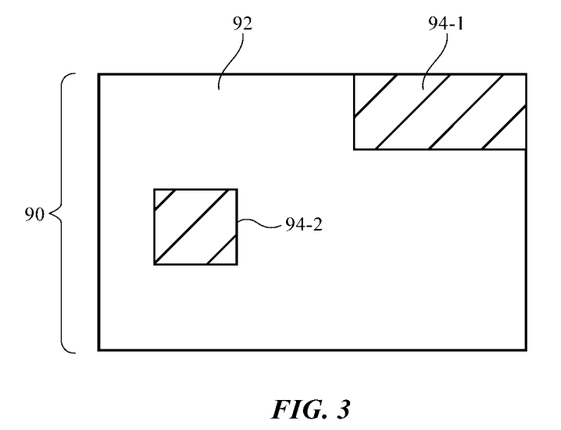
FIGS. 3 and 4 are diagrams showing how a portion of a user's field of view may be modified by increasing opacity and/or overlaying computer-generated content in different regions of the field of view in accordance with an embodiment.
Figure 4:
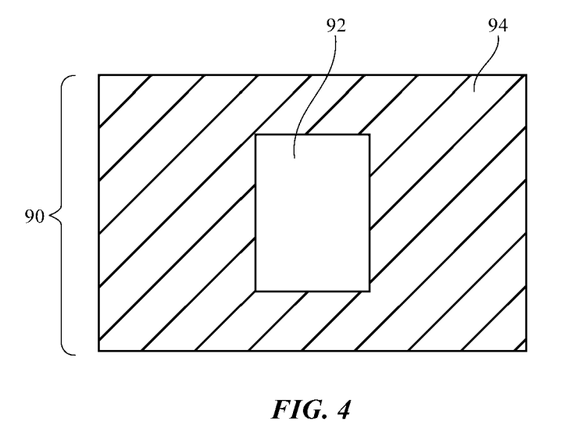

FIGS. 3 and 4 represent a user's field of view and show how the adjustable opacity system may be used to form different transparent and opaque regions in the display. As shown in FIG. 3, rectangle 90 represents a user's field of view. The entire field of view may be provided with light 80 (e.g., corresponding to real-world object 30). The field of view may have a first region 92 and second and third regions 94-1 and 94-2, as shown in FIG. 3. These regions may be overlapped by display 26 (e.g., the display of FIG. 2) so that computer-generated content can be displayed for the user. The regions are also overlapped by adjustable opacity system 20 so that different regions may be provided with different opacities.

As an example, an adjustable opacity layer of adjustable opacity system 20 may be configured to be transparent in region 92 (sometimes referred to as transparent region 92) of FIG. 3 and to be opaque in regions 94-1 and 94-2 (sometimes collectively referred to as opaque region 94) of FIG. 3. As shown in FIG. 3, area 94-1 is located in the corner of field of view 90 whereas area 94-2 is located in a more central portion of field of view 90 (where area 94-2 is surrounded by area 92). When region 92 is transparent and regions 94-1 and 94-2 are opaque, the real world will be visible in region 92 and regions 94-1 and 94-2 will be black in the absence of displayed content from display 26. This type of arrangement may be used, for example, to block objectionable or distracting content in the user's field of view from the user. Full or partial reductions in light transmission through selected areas of field of view 90 such as areas 94-1 and 94-2 may also be used to block glare from lights, glare from reflections, glare from the sun, or other sources of distracting and unwanted light. In FIG. 3, for example, area 94-1 may block glare from the sun whereas area 94-2 may block glare from reflections. If desired, display 26 may be used to display notifications, computer-generated content such as still and/or moving images corresponding to a game or other application, and/or other visual content in region 94-1 and/or 94-2. For example, region 94-1 may block glare from the sun and computer-generated content may be displayed in region 94-2. The dark background created by making region 94-2 opaque may help the user view display output in region 94-2 because the light associated with images in region 94-2 will not need to compete with light from underlying real-world objects. Display content may also be presented in region 92 or display 26 may not display any content in region 92. Opaque region 94 may also be used to provide computer-generated content with black coloring. If the entire field-of-view is transparent, the real-world light provided to the field-ofview may prevent content with black coloring from being displayed. By making portions of the field-of-view opaque with the adjustable opacity system, displaying computer-generated content with black coloring becomes possible.

The size, shapes, and locations of the boundaries of regions 92, 94-1, and 94-2 may be updated in real time by control circuitry 50 using information from input-output circuitry 52 (e.g., using information on the position of object 30 from front-facing camera 64 and other sensors in devices 60, based on information from gaze detection system 62, based on the orientation of the head-mounted device 10, etc.).

In the example of FIG. 4, region 94 surrounds region 92. Region 94 may be darkened (e.g., rendered partly or fully opaque using the adjustable opacity system) while region 92 is made completely transparent (or at least more transparent than region 94). This type of arrangement may be used, for example, when using head-mounted device 10 to highlight an object in the user's field of view. Real-world objects in region 94 may be blocked from the user's view. Transparent region 92 of FIG. 4 may be dynamically aligned with object 30 (FIG. 2). For example, control circuitry 50 may use image data gathered with front-facing camera 64 to detect the location of object 30 and, based on this information, may darken appropriate pixels of the adjustable opacity layer to visually highlight object 30 and to block out distracting peripheral objects. This may be done automatically or may be done only in the presence of bright light detected by ambient light sensor 68. Computer-generated content (e.g., pre-recorded video, a still image, graphics, solid colors or patterns, computer-generated images for a game or other application, etc.) may be overlaid over darkened region 94 or region 94 may be left black (or at least partly darkened).

The size, shapes, and locations of the boundaries of regions 92 and 94 may be updated in real time by control circuitry 50 using information from input-output circuitry 52 (e.g., using information on the position of object 30 from front-facing camera 64 and other sensors in devices 60, based on information from gaze detection system 62, based on the orientation of the head-mounted device 10, etc.).

As the foregoing examples demonstrate, region 90 (the user's field of view or part of the user's field of view) may be subdivided into multiple subregions such as regions 92 and 94. There are two and three subregions in the examples of FIGS. 3 and 4 respectively, but more subregions may be created if desired (e.g., 2-10, more than 2, more than 5, fewer than 20, etc.). In each subregion, control circuitry 50 can create abrupt and/or smoothly graded changes in light transmission. For example, in each of multiple portions of the user's field of view, control circuitry 50 can create a different light transmission (e.g., a visible light transmission T that is set to an adjustable value between 0% and 100%) using individually adjustable pixels of adjustable opacity system 20. In each of these regions, display pixels of display 26 may be inactive and may display no content or may be active and used in displaying images. Adjustments may be made based on orientation, eye behavior, detected attributes of real-world objects, sensor input, user commands, or other parameters.

Consider, as another example, a scenario in which control circuitry 50 uses gaze-tracking system 62 to monitor the user's eyes. An eye tracking system may, as an example, monitor the location (e.g., the plane) at which the user's eyes 12 are focused in real time. In response to detection that eyes 12 are focused on display 26, control circuitry 50 can enhance the opacity of adjustable opacity system 20 (e.g., the adjustable opacity layer can be made opaque), thereby enhancing the visibility of content on display 26 and blocking out real-world objects behind display 26. In response to detection that eyes 12 are focused at a distance (e.g., at infinity or at another distance that is farther away from the user's eyes 12 than display 26 or the apparent position of display 26), control circuitry 50 can be configured to enhance the transparency of adjustable opacity system 20 (e.g., the adjustable opacity layer can be made transparent), thereby enhancing the visibility of real-world objects through display 26 and allowing pixels in display 26 to optionally be used to display computer-generated content over real-world objects that are visible through display 26.

If desired, control circuitry 50 can be configured to adjust adjustable opacity system 20 to be transparent during a normal operating mode (so that object 30 can be viewed through display 26) and to be opaque in all but a subset of region 90 (e.g., to be transparent in region 92 of FIG. 4 while being opaque in region 94 of FIG. 4) during a highlighting mode, thereby allowing real-world objects that are aligned with region 92 to be visible and blocking real-world objects that are not overlapped by region 92. This type of highlighting mode may be invoked in response to user input, in response to detection of an object of interest for highlighting, in response to orientation information, in response to detection of sources of glare outside of region 92 (e.g., using front-facing camera 64), in response to detection of a particular operating mode for display 10 (e.g., in response to running of a particular application or other software code on control circuitry 50), or in response to satisfaction of other criteria.

In some situations, it may be desirable to exclude background objects (e.g., by making one or more subregions such as region 94 opaque while making region 92 transparent). This type of arrangement may be use to remove glare, to block undesired distractions (text, moving objects, and/or other visual clutter) from view, etc. Background object exclusion operations can be performed automatically by control circuitry 50 based on information gathered by front-facing camera 64 and based on other information gathered by input-output devices 60.

There are many possible arrangements for adjustable opacity system 20. For example, adjustable opacity system 20 may be a cholesteric liquid crystal layer, may be a light modulator based on a switchable metal hydride film (e.g., an adjustable magnesium hydride mirror structure), may be a suspended particle device, may be an electrochromic light modulating device, may be a guest-host liquid crystal light modulator, or may be any other suitable light modulator layer for adjusting light transmission.

Figure 5:
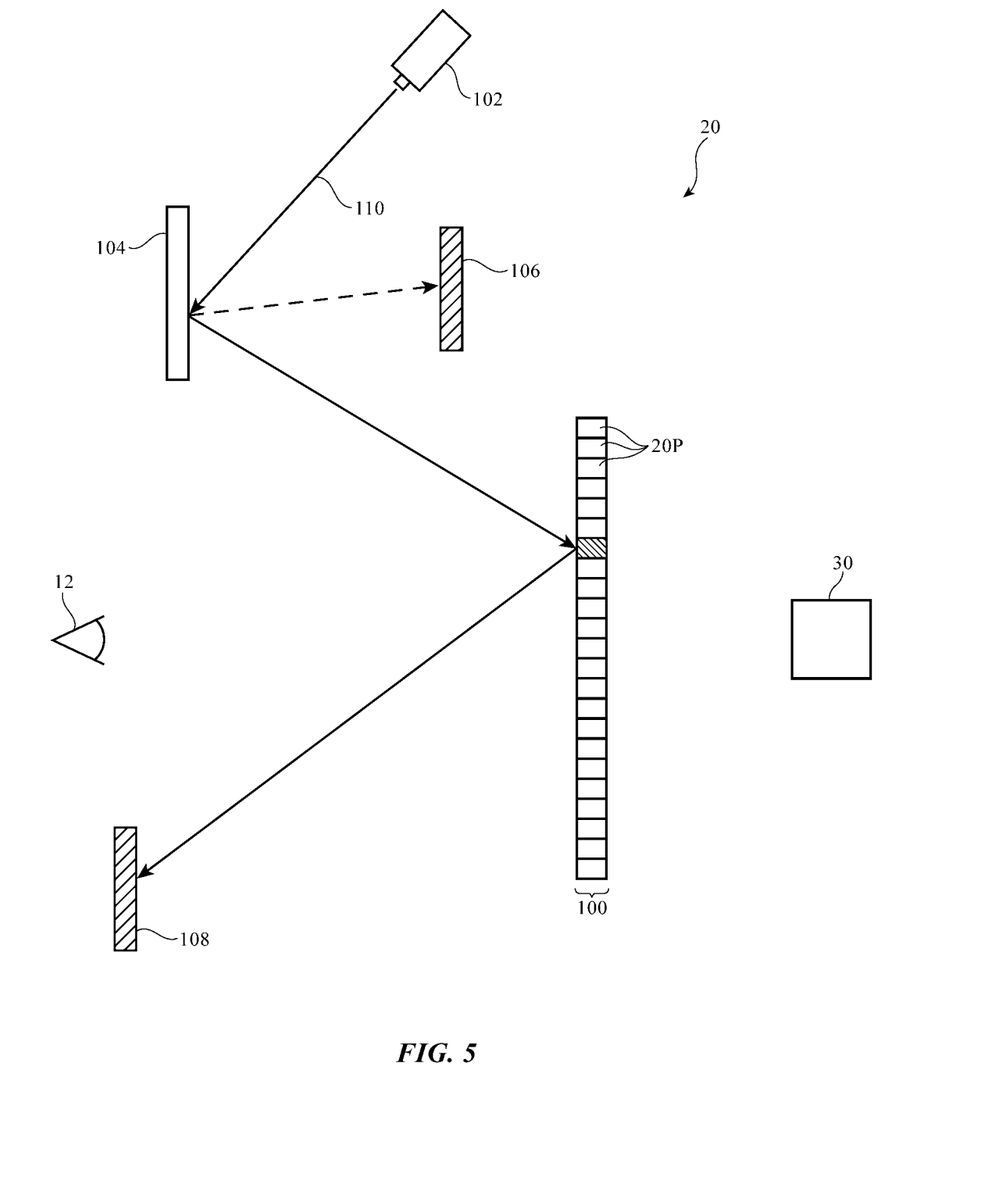
FIG. 5 is a diagram of an illustrative adjustable opacity system where a light source selectively exposes each light modulating pixel of a photochromic layer to light to control the opacity of each light modulating pixel in accordance with an embodiment.

FIG. 5 is a diagram of one possible arrangement for adjustable opacity system 20. In the embodiment of FIG. 5, adjustable opacity system 20 includes a photochromic layer such as photochromic layer 100 (sometimes referred to as adjustable opacity layer 100). Photochromic layer 100 is formed from a photochromic material that changes from transparent to opaque when exposed to light of a particular wavelength (e.g., ultraviolet light). Light source 102 emits light 110 that is selectively directed towards photochromic layer 100. The photochromic layer 100 has a plurality of adjustable opacity pixels 20P that each can be individually controlled to be either transparent or opaque (by exposing or not exposing each pixel to light from the light source.

In some cases, light source 102 may emit light that is projected directly on photochromic layer 100. In other embodiments, the light source may emit light 110 that is redirected by a microelectromechanical (MEMS) mirror array such as MEMS mirror array 104. MEMS mirror array 104 may be a digital micromirror device (DMD) with an array of mirrors that can be individually rotated to direct light from light source 102 to a desired location. In one illustrative example, each mirror of the mirror array may correspond to a respective adjustable opacity pixel 20P in the photochromic layer 100. An adjustable opacity pixel 20P may be placed in a transparent state by having the corresponding mirror in MEMS mirror array 104 direct light from the light source towards absorber 106 (where the light is absorbed). Because the adjustable opacity pixel is not exposed to the light from the light source, the adjustable opacity pixel remains transparent (e.g., the adjustable opacity pixels are transparent in the absence of light from the light source). In contrast, an adjustable opacity pixel 20P may be placed in an opaque state by having the corresponding mirror in MEMS mirror array 104 direct light from the light source towards the adjustable opacity pixel. When the adjustable opacity pixel is exposed to the light from the light source, the adjustable opacity pixel becomes opaque (e.g., at least more opaque than when the adjustable opacity pixel is not exposed to the light from the light source). The length of time the adjustable opacity pixel is exposed to the light from light source 102, the wavelength of the light from the light source, and/or the intensity of the light from the light source may be adjusted to control the opacity of each adjustable opacity pixel.

The adjustable opacity system may also include an absorber 108 that absorbs light 110 that reflects off of the photochromic layer (or other stray light from light source 102). In this way, absorber 108 may prevent user eyes 12 from being exposed to the light. Absorbers 106 and 108 may be formed from any desired material that absorbs light from light source 102 (e.g., absorbs more than 70% of the light, more than 80% of the light, more than 90% of the light, more than 95% of the light, more than 99% of the light, etc.). For example, the absorbers may be formed from black ink or any other desired material. The absorbers may be formed as a coating on other device components if desired.

Light source 102 may emit any desired type of light. Light source 102 may emit ultraviolet light (e.g., light with a wavelength less than 380 nanometers), visible light (e.g., light with a wavelength between 380 and 750 nanometers), infrared light (e.g., light with a wavelength greater than 750 nanometers), or light of any other desired type that can control the opacity of photochromic layer 100. Light source 102 may have built-in lenses and/or collimating optics. Additionally, optical components may be incorporated at other desired locations in the optical path between light source 102 and photochromic layer 100 (e.g., between light source 102 and MEMS mirror array 104). Other components and functionalities (e.g., the MEMS mirror array 104 and absorber 106) may be incorporated into the light source if desired.

Photochromic layer 100 may be formed from any desired photochromic material. In one example, the photochromic layer may include silver chloride (AgCl). When not exposed to ultraviolet light, the silver chloride may be transparent. When exposed to ultraviolet light of sufficient intensity, the silver chloride changes to a shape that absorbs visible light and is therefore opaque. This transition is reversible. Therefore, each pixel in the photochromic layer may be repeatedly switched between the transparent state and opaque state as desired.

Figure 6:
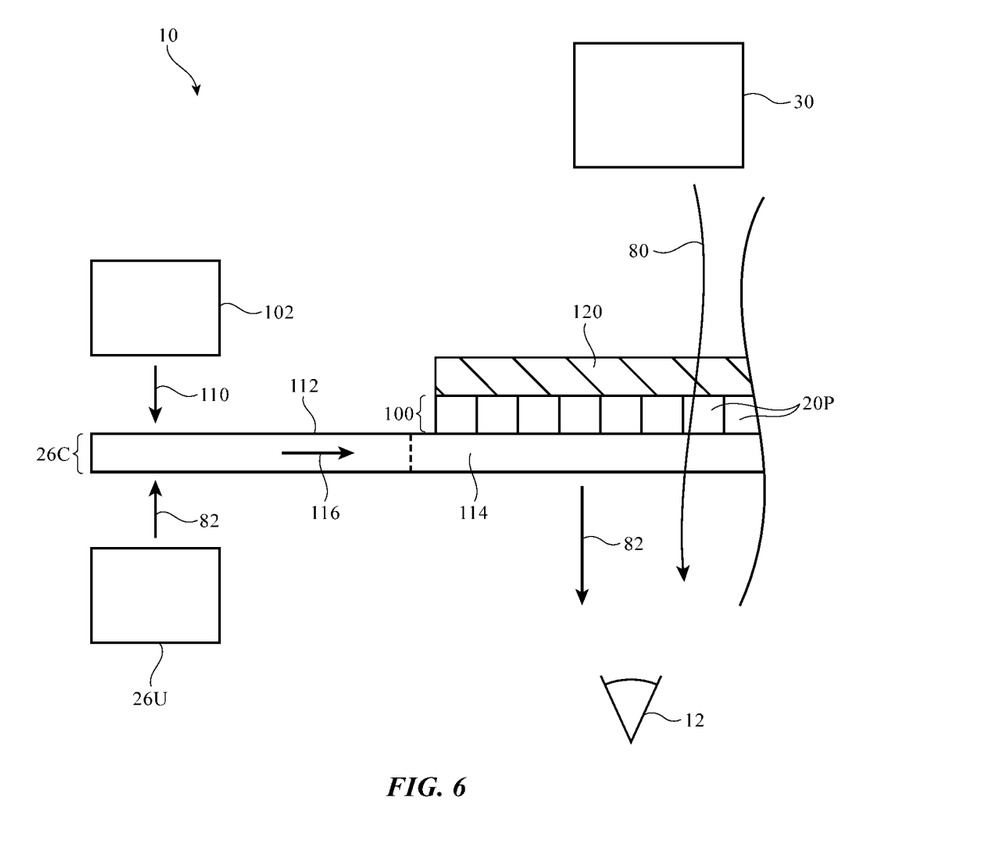
FIG. 6 is a diagram of an illustrative head-mounted device showing how an optical coupler may be used to both direct display light to a user and direct light to a photochromic layer of an adjustable opacity system in accordance with an embodiment.

As previously mentioned in connection with FIG. 2, an optical coupler (26C) may be used to provide display light from a display unit to the user. If desired, the light (from light source 102) for controlling photochromic layer 100 may also be directed using optical coupler 26C. FIG. 6 is a diagram showing how an optical coupler may be used by both the display unit and the light source for the adjustable opacity system. The diagram of FIG. 6 includes components for one of the user's eyes. Device 10 may use these components to provide images to both of a user's eyes or may contain two sets of such components to present images to both of a user's eyes.

As shown in FIG. 6, device 10 may include a display unit such as display 26U for producing image light 82. Image light 82 may be generated by illuminating a reflective display containing an array of pixels, as an example. Display 26U may be a liquid-crystal-on-silicon display, a microelectromechanical systems (MEMs) display, or other type of display. The images presented on the array of pixels may be conveyed to input coupler region 112 which couples image light 82 into optical coupler 26C (e.g., a waveguide). The image light coupled into waveguide 26C is confined within waveguide 26C in accordance with the principal of total internal reflection and travels towards output coupler region 114 as indicated by arrow 116. Output coupler 114 couples light 82 (image light) out of waveguide 26C and towards viewer 12 (an eye of a user) as output light. Additionally, light 80 from real-world object 30 may pass through waveguide 26C to be viewed by viewer 12. In this way, display unit 26U may generate images that are viewed by the viewer and that overlap the real-world scene.

Light source 102 of adjustable opacity system 20 may also emit light (110) that is conveyed to input coupler 112. Input coupler 112 couples the light from light source 102 into waveguide 26C. The light from light source 102 may be confined within waveguide 26C in accordance with the principal of total internal reflection and travel towards output coupler 114 as indicated by arrow 116. Output coupler 114 may then couple light 110 out of waveguide 26C and towards photochromic layer 100. The output coupler 114 may selectively output the light from light source 102 to a desired adjustable opacity pixel 20P (to selectively render each adjustable opacity pixel opaque or transparent).

Input coupler 112 and output coupler 114 may include, for example, structures such as Bragg gratings that couple light into waveguides and that couple light out of the waveguides. Couplers 112 and 114 may be formed from volume holograms or other holographic coupling elements (e.g., thin layers of polymers and/or other optical coupler structures in which holographic patterns are recorded using lasers). Each of the Bragg gratings or holographic coupling elements may be selective to a particular wavelength (e.g., will only effect light of the particular wavelength). For example, a first set of holographic coupling elements may effect ultraviolet light from light source 102 and a second set of holographic coupling elements may effect visible light from display unit 26U. Couplers 112 and 114 may have infinite focal lengths (e.g., couplers 112 and 114 may be plane-to-plane couplers) or may have associated finite focal lengths. For example, optical coupler 112 and/or 114 can be powered (e.g., coupler 112 and/or 114 can be configured to form a lens of a desired finite focal length).

Light source 102 and display unit 26U may share optical coupler 26C (e.g., light source 102 and display unit 26U may both emit light into optical coupler 26C). In one embodiment where display unit 26U and the ultraviolet light source 102 share the optical coupler, the display unit 26U and light source 102 are formed separately. In this embodiment, the display unit 26U may alternately emit red light, green light, and blue light (as an example). In another embodiment, however, the display unit 26U and light source 102 may be combined into a single light source. For example display unit 26U may alternately emit red light, green light, blue light, and ultraviolet light (or another wavelength of interest for the photochromic layer). In yet another embodiment, light source 102 and display unit 26U may each have respective optical couplers (e.g., optical coupler 26C in FIG. 6 may represent one waveguide for directing light from light source 102 to photochromic layer 100 and another waveguide for directing light from display unit 26U to the viewer).

To optimize the performance of head-mounted device 10, it may be desirable for photochromic layer 100 to transition between opaque and transparent states as quickly as possible. In other words, it is desirable to reduce latency associated with the control of adjustable opacity pixels 20P. Therefore, head-mounted device 10 may include a heating element 120 that is used to heat photochromic layer 100. Heating element 120 may be formed from an ohmic heater (sometimes referred to as a resistive heater) that heats upon application of current, may be formed from a Peltier effect heating element, and/or may be formed from other heating structures. The heating element may be formed from a layer of indium tin oxide (ITO) that is sufficiently thin to be transparent to incoming light 80 from real-world objects.

During operation, control circuitry 50 may use heating element 120 to heat photochromic layer 100. The photochromic layer may be more responsive when heated (e.g., the photochromic layer will switch between transparent and opaque states in a shorter length of time than if the photochromic layer was not heated). Heating element 120 may heat photochromic layer 100 globally (e.g., so that the photochromic layer has a uniform temperature or approximately uniform temperature across the photochromic layer). Alternatively, the heating element may have a number of separate and individually controllable portions that are each heated to desired temperatures (such that different portions of the photochromic layer can be heated to different temperatures). A temperature sensor (that measures the temperature of one or more portions of heating element 120 and/or photochromic layer 100) may be used in controlling heating element 120 if desired.

Figure 7:
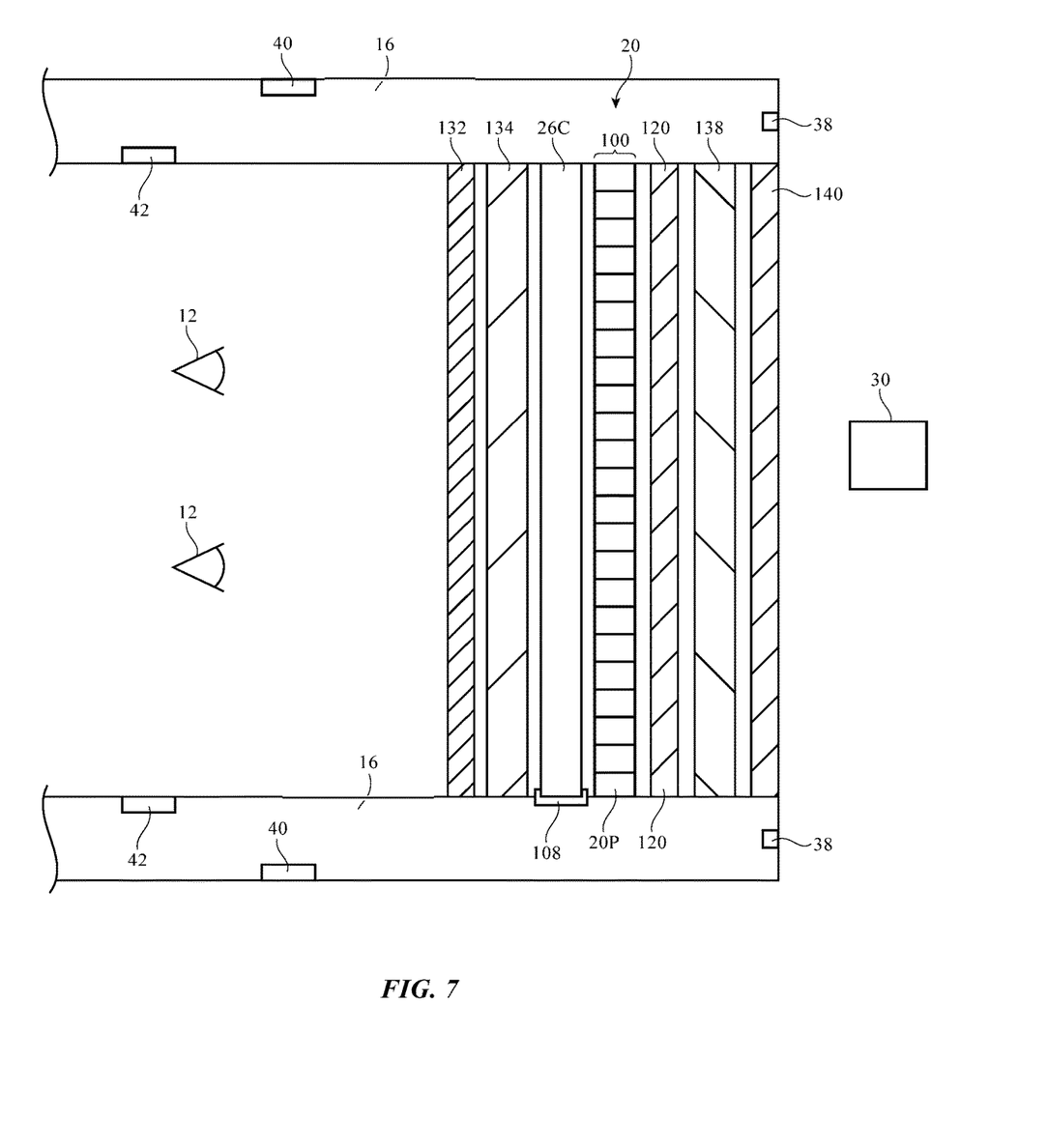
FIG. 7 is a top view of an illustrative head-mounted device with support structures that support an optical coupler and a photochromic layer for an adjustable opacity system in accordance with an embodiment.

The components of head-mounted device 10 may be supported by a head-mountable support structure such as illustrative support structure 16 of FIG. 7. Support structure 16 may have the shape of the frame of a pair of glasses (e.g., left and right temples and other frame members), may have a helmet shape, or may have another head-mountable configuration. When worn on the head of a user, the user may view real-world objects such as object 30 through components such as filter layer 132, substrate 134, optical coupler 26C, adjustable opacity layer 100, heating element 120, substrate 138, and filter layer 140. Filter layer 132, substrate 134, optical coupler 26C, adjustable opacity layer 100, substrate 136, substrate 138, and filter layer 140 may all be supported by support structure 16 and may be placed in front of user eyes 12 when worn on the head of the user.

Support structure 16 may support additional components at additional locations such as locations 38, 40, and 42. For example, components may be mounted on the front of support structure 16 in location 38. Front-facing cameras 64 and/or sensors and other components in input-output circuitry may be mounted in location 38. The components in location 38 may be used to detect the positions of real-world objects (e.g., object 30) and/or for capturing images of the real-world. Object 30 may include natural and manmade objects, people, buildings, sources of glare such as reflective objects, the sun, lights, etc.

Input-output devices 60 such as position and motion sensors 66, light detectors 68, or other desired input-output devices may be mounted in location 40. Components in location 40 may face the environment of the user (e.g., outward facing components facing away from the user) whereas components in location 42 may face the user (e.g., inward facing components facing the user). Input-output devices 60 such as gaze-tracker 62 (image sensors), speakers (e.g., ear speakers) or other audio components that play audio (e.g., audio associated with computer-generated images and/or other content that is being displayed using display 26, etc.) or other desired input-output devices may be mounted in location 42.

Optical coupler 26C may be interposed between the user's eyes 12 and adjustable opacity layer 100. With this arrangement, the adjustable opacity layer is able to provide a dark background for display light provided to the user from optical coupler 26C. Adjustable opacity layer 100 may be interposed between optical coupler 26C and heating element 120.

If desired, substrates such as substrates 134 and 138 may be provided in head-mounted device 10. As shown in FIG. 7, optical coupler 26C, photochromic layer 100, and heating element 120 may be interposed between substrates 134 and 138. Substrates 134 and 138 may be formed from glass or any other desired transparent material. Head-mounted device 10 may also include filter layers 132 and 140. Filter layers 132 and 140 may serve to filter (e.g., block) light of a desired wavelength. In particular, filter layers 132 and 140 may be used to filter light of the wavelength that is used to control photochromic layer 100 (e.g., ultraviolet light 110 in FIG. 6). To prevent the ultraviolet light from reaching the user's eyes 12 or others around the user, the photochromic layer 100 and optical coupler 26C are interposed between ultraviolet filter layers 132 and 140 (e.g., filter layers 132 and 140 may transmit less than 5% of ultraviolet light, less than 1% of ultraviolet light, etc.). If a different type of light than ultraviolet light is used for the light source for the adjustable opacity system (e.g., infrared light), the filter layers 132 and 140 may filter that type of light. If desired, the filtering properties of filter layers 132 and 140 may be combined with another layer (e.g., filter layers 132 and 140 may be omitted and substrates 134 and 138 may have filtering properties).

Additional components of adjustable opacity system 20 and display 26 may be mounted on (supported by) support structure 16. For example, light source 102 and display unit 26U may be mounted on support structure 16. Light source 102 and display unit 26U may emit light into an input coupler region of optical coupler 26C, for example. MEMS mirror array 104 and absorber 106 may also be supported by support structure 16. As shown in FIG. 7, absorbing material for absorbing excess ultraviolet light from light source 102 may be coated on additional components in the head-mounted device. Coating 108 in FIG. 7 coats the edge of optical coupler 26C. This coating may absorb ultraviolet light (or other light form light source 102) and may prevent ultraviolet light from exiting the optical coupler and reaching the user's eyes.

If desired, additional lenses may be incorporated at any desired location within head-mounted device 10. For example, additional lenses may be incorporated in the optical path of display light from display unit 26U. Additional lenses may also be incorporated in the optical path of ultraviolet light from light source 102.

The example of FIG. 7, where waveguide 26C is used to both provide display light to the user and ultraviolet light to the photochromic layer, is merely illustrative. As previously mentioned, support structure 16 may instead support one waveguide for providing display light to the user and a second, separate waveguide for providing ultraviolet light to the photochromic layer.

Additionally, the examples of FIGS. 5-7 where photochromic layer 100 is planar are merely illustrative. In general, the photochromic layer (as well as the optical coupler and any other layers in the head-mounted device) may have any desired shape. For example, the photochromic layer may be curved along one or more axes if desired.

The foregoing is merely illustrative and various modifications can be made to the described embodiments. The foregoing embodiments may be implemented individually or in any combination.

What is claimed is:

1. A head-mounted device operable to receive real-world light from external real-world objects, the head-mounted device comprising:
    a head-mounted support structure;
    a display that generates images;
    an optical coupler that is supported by the head-mounted support structure, that presents the real-world light for viewing, and that is configured to present the images from the display over the real-world light;
    an adjustable opacity system including a photochromic layer that is configured to selectively darken portions of the real-world light from view;
    an ultraviolet light source configured to emit ultraviolet light;
    an ultraviolet light absorber that is formed separately from the photochromic layer; and
    a microelectromechanical mirror array configured to receive the ultraviolet light from the ultraviolet light source, wherein each mirror in the microelectromechanical mirror array has a first state in which the respective mirror directs the ultraviolet light towards a respective adjustable opacity pixel of the photochromic layer and a second state in which the respective mirror directs the ultraviolet light towards the ultraviolet light absorber.

2. The head-mounted device defined in claim 1, wherein the optical coupler comprises a waveguide that receives the images from the display and presents the images for viewing.

3. The head-mounted device defined in claim 2, wherein the waveguide receives the ultraviolet light from the ultraviolet light source and directs the ultraviolet light towards selected portions of the photochromic layer.

4. The head-mounted device defined in claim 3, wherein an edge of the waveguide is coated with an absorbing material that is configured to absorb the ultraviolet light from the ultraviolet light source.

5. The head-mounted device defined in claim 2, wherein the adjustable opacity system further comprises an additional waveguide that receives the ultraviolet light from the ultraviolet light source and directs the ultraviolet light towards selected portions of the photochromic layer.

6. The head-mounted device defined in claim 1, wherein the optical coupler and the photochromic layer are interposed between first and second filter layers that filter the ultraviolet light from the ultraviolet light source.

7. The head-mounted device defined in claim 1, wherein the adjustable opacity system further comprises a heating element that is adjacent to the photochromic layer and that is configured to heat the photochromic layer.

8. A head-mounted device, comprising:
    a head-mounted support structure;
    a display that generates images;
    a waveguide that is supported by the head-mounted support structure and that is configured to present the images for viewing;
    a photochromic layer that is supported by the head-mounted support structure and that overlaps the waveguide;
    a light source that is configured to expose the photochromic layer to light to adjust an opacity of the photochromic layer;
    a heating element that is supported by the head-mounted support structure and that is configured to heat the photochromic layer;
    a first filter layer that is supported by the head-mounted support structure and that is configured to block the light from the light source, wherein the heating element is interposed between the first filter layer and the photochromic layer; and
    a second filter layer that is supported by the head-mounted support structure and that is configured to block the light from the light source, wherein the waveguide is interposed between the second filter layer and the photochromic layer.

9. The head-mounted device defined in claim 8, wherein the light source is an ultraviolet light source.

10. The head-mounted device defined in claim 8, wherein the light source is configured to emit the light into an input coupler of the waveguide and wherein an output coupler of the waveguide is configured to direct the light towards selected portions of the photochromic layer.

11. The head-mounted device defined in claim 8, further comprising:
    an additional waveguide, wherein the light source is configured to emit the light into an input coupler of the additional waveguide and wherein an output coupler of the additional waveguide is configured to direct the light towards selected portions of the photochromic layer.

12. The head-mounted device defined in claim 8, further comprising:
    a front-facing camera supported by the head-mounted support structure; and
    control circuitry configured to control the light source to adjust the opacity of the photochromic layer based on information from the front-facing camera.

13. The head-mounted device defined in claim 8, further comprising:
    a gaze-tracking system supported by the head-mounted support structure; and
    control circuitry configured to control the light source to adjust the opacity of the photochromic layer based on information from the gaze-tracking system.

* * * * *